United States Patent [19]
Hatch

[11] 4,207,778
[45] Jun. 17, 1980

[54] REINFORCED CROSS-PLY COMPOSITE FLYWHEEL AND METHOD FOR MAKING SAME

[75] Inventor: Burton D. Hatch, Ballston Lake, N.Y.

[73] Assignee: General Electric Company, Schenectady, N.Y.

[21] Appl. No.: 955,830

[22] Filed: Oct. 30, 1978

Related U.S. Application Data

[63] Continuation-in-part of Ser. No. 753,600, Dec. 22, 1976, abandoned, which is a continuation-in-part of Ser. No. 706,896, Jul. 19, 1976, Pat. No. 4,102,221.

[51] Int. Cl.² .......................... G05G 1/00; G05G 3/00
[52] U.S. Cl. ........................................ 74/572; 428/65; 428/113
[58] Field of Search ............. 74/572, 573 R, DIG. 10; 428/64, 65, 113

[56] References Cited

U.S. PATENT DOCUMENTS

| 1,601,911 | 10/1926 | Godfrey | 428/65 |
|---|---|---|---|
| 1,638,012 | 8/1927 | Hoof | 428/65 |
| 2,745,224 | 5/1956 | Erickson | 51/195 |
| 3,296,886 | 1/1967 | Reinhart, Jr. | 74/572 |
| 3,363,479 | 1/1968 | Pickels | 74/572 |
| 3,602,066 | 8/1971 | Wetherbee, Jr. | 74/572 |
| 3,602,067 | 8/1971 | Wetherbee, Jr. | 74/572 |
| 3,788,162 | 1/1974 | Rabenhorst et al. | 74/572 |
| 3,859,868 | 1/1975 | Post | 74/572 |
| 3,884,093 | 5/1975 | Rabenhorst | 74/572 |
| 3,977,273 | 8/1976 | Ernst et al. | 74/572 |
| 3,988,947 | 11/1976 | Lenz | 74/572 |
| 4,000,665 | 1/1977 | Rabenhorst | 74/572 |
| 4,098,142 | 7/1978 | Weyler, Jr. | 428/65 |
| 4,102,221 | 7/1978 | Hatch | 74/572 |
| 4,138,286 | 2/1979 | Chevrolet et al. | 74/572 |

FOREIGN PATENT DOCUMENTS

| 61717 | 6/1913 | Austria | 74/572 |
|---|---|---|---|
| 90543 | 12/1922 | Austria | 428/65 |
| 552016 | 6/1932 | Fed. Rep. of Germany | 428/65 |

OTHER PUBLICATIONS

"Scotch Ply", Snell and Schurb, Nov. 1975, pp. 203–209.
Proceeding of the 1975 Flywheel Technology Symposium, Nov. 10–12, 1975, ERDA 76-85, pp. 164–184.
"Flywheels", R. F. Post et al., vol. 299, No. 6, Scientific American, 1973, pp. 17–23.

Primary Examiner—Leslie Braun
Attorney, Agent, or Firm—Richard G. Jackson; James C. Davis, Jr.; Paul R. Webb, II.

[57] ABSTRACT

A cross-ply composite flywheel is provided with a rim portion of circumferentially wound fibers impregnated with a binder. The density-to-stiffness ratio of the rim portion is of a value substantially less than the density-to-stiffness ratio of the cross-ply central portion of the flywheel. The strength of the flywheel is enhanced and only a minimum contribution is made to the weight of the flywheel.

14 Claims, 3 Drawing Figures

REINFORCED CROSS-PLY COMPOSITE FLYWHEEL AND METHOD FOR MAKING SAME

This is a continuation-in-part of copending application Ser. No. 753,600, filed Dec. 22, 1976, now abandon and incorporated herein by reference, which in turn was attempted to be made a continuation-in-part of then copending application Ser. No. 706,896, filed July 19, 1976, now U.S. Pat. No. 4,102,221.

BACKGROUND OF THE INVENTION

This invention relates to flywheels adapted for the storage of energy and more particularly to cross-ply composite flywheels having reinforced rim portions.

To overcome various disadvantages such as high weight and potentially dangerous fracture mechanics associated with metallic flywheels, composite flywheels have been developed. These composite flywheels are normally fabricated from a multiplicity of glass or similar fibers disposed in a matrix or binder of epoxy or other suitable resin. Such composite flywheels are generally of a high strength-to-density ratio and therefore, to be able to store sufficient amounts of energy, may be required to rotate at extremely high speeds such as tens of thousands of revolutions per minute. These prior art composite flywheels have for the most part been formed by a circumferential distribution of all the fibers within the binder or matrix. Since, when a body rotates it is subject to stresses due to centrifugal force in a radially outward direction, such prior art composite flywheels must carry this centrifugal stress in directions normal to the axes of the fibers from which it is formed, placing the resin matrix in tension. Analysis has shown that such radial stresses are greatest in magnitude at locations approximately mid-way between the center and outer edge of the flywheel. Usually, epoxy and other resins employed with composite flywheels are relatively weak when loaded in tension as compared to the strengths of the fibers. Therefore, a high rotational speed of such a composite flywheel can cause the flywheel to shred, breaking apart in the matrix along circumferential lines between the fibers.

To overcome such deficiencies of these prior art composite flywheels having a complete circumferential distribution of fibers, cross-ply composite flywheels have been developed. Such cross-ply composite flywheels comprise a plurality of overlying fiber layers embedded in a monolithic matrix of binder material. The fibers of each layer are parallel to each other and extend in radial and chordal directions. The fibers of each successive layer are oriented at a single predetermined angle to those of a preceding adjacent layer. Preferably, the arrangement is such that at least four layers of fibers are disposed between any two layers of fibers in which the fibers of both such layers extend substantially parallel to each other. By this structure the cross-ply composite flywheel is made to exhibit a high strength-to-weight ratio. The preferred cross-ply composite flywheel construction is described and claimed in U.S. patent application Ser. No. 706,896, filed on July 19, 1976 in the name of Burton D. Hatch, entitled entitled "Cross-Ply Composite Flywheel" and now U.S. Pat. No. 4,102,221.

Prior to the invention described in the U.S. Pat. No. 4,102,221, composite materials were known which were formed from unified laminar constructions, each lamination comprising a multiplicity of parallel fibers embedded in a matrix of binder material and overlying an adjacent lamination such that the fibers of adjacent laminations are oriented at angles of either 60° or 90° with respect to each other. However, flywheels formed from such prior art materials of these laminar constructions and particular angular orientations exhibit significant variations in load carrying abilities throughout their mass. For example, in a flywheel having a 60° orientation between fibers of adjacent layers, if a first point is capable of carrying a particular value of centrifugal loading at a given radial strain (i.e. displacement), a second point at the same radius but displaced by 30° from the first point will be able to accommodate only 87% of that loading at the same radial strain. Such a variation in strength and stiffness throughout a flywheel has the effect of introducing shear stresses and severely limiting the load carrying ability of the flywheel and therefore limits the energy storage capabilities of the flywheel.

As described in U.S. Pat. No. 4,102,221 (principally in connection with its FIGS. 5 and 6), in flywheels thereof employing an angular offset of approximately 70° to approximately 110° the fibers of one layer are in near perpendicular orientation with respect to fibers of an adjacent layer. In this construction a major portion of a centrifugal force acting in a direction approximately perpendicular to the axes of a fiber in a given layer is transmitted to an adjacent fiber of an adjacent layer; the adjacent layer accommodates the transmitted force by a resultant axial force, i.e. in the direction of the fiber's greatest strength. With small angles such perpendicular forces on a given fiber could not be so transmitted to adjacent fibers of adjacent layers.

It has been found that the energy storage capability of the cross-ply composite flywheel may be improved upon in certain respects. Each composite layer of such a flywheel, at locations on the outer edge thereof, includes fibers oriented such that the direction of the fibers is perpendicular to a radius. Therefore, these composites are centrifugally loaded in a direction approximately 90° from the axes of the fibers, a direction in which the composite elements are relatively weak as compared to their strengths when axially loaded. The cross-ply configuration allows loads in such fibers disposed in a central layer to be effectively transferred to radially directed fibers in layers adjacent each side of the central layer. However, such fibers when disposed in an axially outer layer (comprising a major surface of the flywheel) are only able to transfer this centrifugal loading in a single axial direction. In this instance the numbers of radially directed fibers to which such loading may be transferred is severly limited. Therefore, the possibility of rupture of the radially outer (chordal) fibers disposed in an axially outermost layer or the failure of the matrix or binder between such fibers due to centrifugal loading may limit the maximum speed of the flywheel and hence the maximum amount of energy which may be stored by the flywheel. By the present invention, this problem is overcome and, thereby the maximum allowable speed of rotation and thus the energy storing capability of the cross-ply composite flywheel are increased.

Therefore, it is an object of the present invention to provide a reinforced cross-ply composite flywheel capable of storing increased amounts of energy within limited constraints of weight and volume.

It is another object of the present invention to provide a reinforced composite cross-ply flywheel wherein the risk of delamination or fracture under high rotational speeds is minimized.

DESCRIPTION OF THE INVENTION

These and other objects apparent from the following detailed description taken in connection with the appended claims and accompanying drawings are attained by providing the cross-ply composite flywheel with a rim portion comprising circumferentially wound high strength fibers impregnated with a binder. The rim portion reinforces the cross-ply composite central portion enclosed thereby by providing for radially outward transfer of the centrifugal loading from the radially outermost chordal fibers employed in the cross-ply portion, thereby reducing the risk of rupture or delamination of these cross-ply fibers. The density-to-stiffness ratio of the composite rim portion is of a value substantially less (quantitatively, e.g. 30 to 60% less) than the density-to-stiffness ratio of the cross-ply composite central portion of the reinforced flywheel. By properly selecting these rim fibers as described herein, the rim portion fibers make only a minimum contribution to the weight of the flywheel, while minimizing the risk of rupture or delamination of the rim fibers due to the centrifugal effect of the fibers' own weight.

DETAILED DESCRIPTION OF THE INVENTION AND MANNER AND PROCESS OF MAKING AND USING IT

Figure 1:
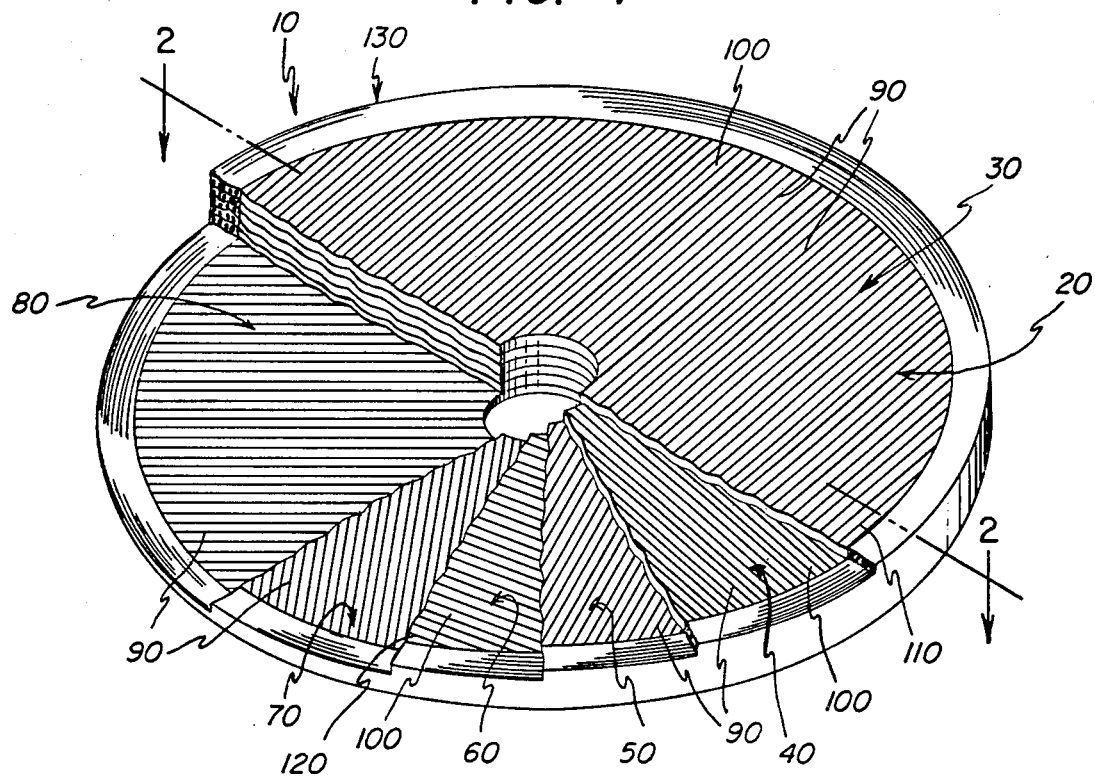
FIG. 1 is an isometric view of the reinforced cross-ply composite flywheel of the present invention partially broken away to show details of construction.
Figure 2:
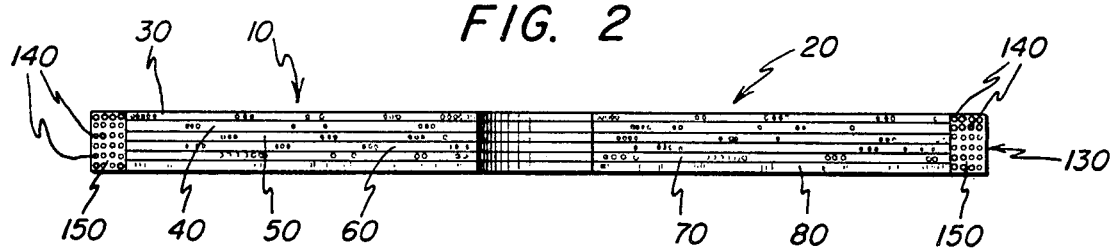
FIG. 2 is a sectional view taken along line 2—2 of FIG. 1.

Referring to FIGS. 1 and 2, there is shown a flywheel 10 comprising a central portion 20 formed from a plurality of fiber-containing layers 30, 40, 50, 60, 70 and 80. Each of these layers contains a multiplicity of generally equally-spaced glass or similar fibers 90, which are parallel to each other and extend in radial and chordal directions. The fibers are disposed in a matrix 100 of epoxy resin or other suitable binder. The fibers of each successive layer are oriented at a single predetermined angle of between approximately 70° and 110° to those of the preceding adjacent layer such that at least four of the fiber-containing layers are disposed between any two layers in which the fibers of both such layers extend substantially parallel to each other. As used herein the term "single predetermined angle" means that the angle is constant throughout the thickness of the flywheel. This angle is preferably approximately 80° as illustrated in FIG. 1 although other angles in the above range may be employed as best suited for a particular application. The binder 100 which is cured after laminations 30 through 80 are laid up comprises a monolithic matrix throughout the flywheel. This preferred cross-ply composite structure is disclosed and claimed in the aforementioned Hatch patent, incorporated herein by reference.

Although this cross-ply structure, per se, overcomes many of the deficiencies of prior art composite flywheels wherein all the fibers making up the flywheel are wound in a circumferential direction, it has been found that the energy storage capabilities of the cross-ply flywheel in turn may be improved upon in certain respects. Again, referring to FIG. 1, it can be seen that each lamination includes fibers such as those shown at 110 and 120, which are disposed at radially outer locations of the flywheel. At these radial outer portions such fibers extend in chordal directions, substantially perpendicular to flywheel radii. Therefore, during operation fibers 110 and 120 are loaded by centrifugal force in directions perpendicular to the axes of the fibers. Since fibers 110 and 120 are strongest in the direction of the fiber axes, these composite layers are loaded in a direction in which they are relatively weak and are, therefore, subject to radial displacement and/or rupture. This is particularly ture in the case of fibers 110. Unlike fibers 120 disposed in the interior of the flywheel and thus able to transfer centrifugal loading to adjacent radially directed fibers in layers 60 and 80, fibers 110 can only transfer this loading, in a single direction, to the radially directed fibers in layer 40. Therefore fibers 110 and that portion of the matrix in which they are disposed must accommodate much of the centrifugal loading. Thus, the speed of rotation and hence the energy storage capability of a flywheel constructed totally in a cross-ply arrangement may be limited by the risk of rupture of fibers in locations exemplified by the location of fibers 110 or by the delamination of the flywheel at those locations.

By the present invention, the strength of the cross-ply flywheel is increased, increasing the energy storage capability of the flywheel. This strengthening is accomplished by adding to the cross-ply construction a relatively high strength light-weight rim portion 130 formed from a multiplicity of generally parallel circumferentially extending fibers 140 at generally equal spacings. These fibers are disposed within a matrix or binder 150 of epoxy resin or other suitable material. Fibers 140 are of a substantially lower (e.g. 30 to 60% lower) density-to-stiffness ratio than fibers 90 disposed in central portion 20 of the flywheel. Preferably, fibers 140 are selected having a value for the density-to-stiffness ratio approximately 40% lower than that of fibers 90. It has been found that polymer fibers produced by E. I. DuPont de Nemours and Company and sold under the trademark Kevlar are particularly well suited for use as rim, or reinforcement, fibers. Such fibers have associated therewith a density-to-stiffness ratio (density/stiffness modulus) of $3 \times 10^{-9}$ in. and a strength of between 400,000 and 500,000 pounds per square inch. This high strength and relatively low density allow the Kevlar fiber to effectively accommodate the transfer of centrifugal loading from the relatively more dense fibers in the alpha cross-ply construction to the rim while minimizing the risk of the radial displacement and/or rupture of the rim fibers.

It should also be noted that a high strength low density rim may be achieved by the utilization of a high-strength, light-weight binder or a combination of a high-strength light-weight binder with high-strength light-weight fibers such as the aforementioned Kevlar fibers.

Due to the present high cost of such fibers as are employed in the rim portion of the flywheel of the present invention, the central portion of the flywheel is still to be constructed of conventional glass or similar fibers 90. Those of fibers 90 extending in generally radial rather than chordal directions, are not centrifugally loaded by their own weight as heavily as the fibers in rim portion 130 and are, therefore, able to withstand such loading with only a minimum risk of rupture or separation. In the preferred embodiment, when Kevlar fibers are employed in the rim portion, fibers 90 in the central portion are formed of glass, having a density-to-stiffness ratio of $5 \times 10^{-9}$ in.

Because of their relatively lower density-to-stiffness ratio, fibers 140 disposed within rim portion 130 are able at any given rotational speed to accommodate a centrifugal loading due to their own weight with a smaller radial displacement than would be the case with the relatively higher density-to-stiffness ratio fibers located in the central portion 20 at the interface with the rim portion of the flywheel.

Therefore, it can be seen that a flywheel constructed in accordance with the present invention is not only stronger and, therefore, capable of being rotated at higher speeds to store increased quantities of energy, but may be made larger than prior art flywheels formed from fibers of a single composition. Such a circumferentially reinforced cross-ply flywheel is, therefore, capable of storing substantially larger quantities of energy than a circumferentially unreinforced cross-ply flywheel, while the risk of failure at the interface of the central portion and the rim is minimized.

The relatively low density-to-stiffness ratio fibers 140 employed in rim portion 130 are substantially more costly than the conventional glass fibers employed in prior art composite flywheels. However, since these low density-to-stiffness ratio fibers are employed only in the rim portion of the flywheel of the present invention where conventional glass fibers would be unable to accommodate the high centrifugal loading, the added expense of the flywheel due to the utilization of these high-strength fibers is minimized.

Figure 3:
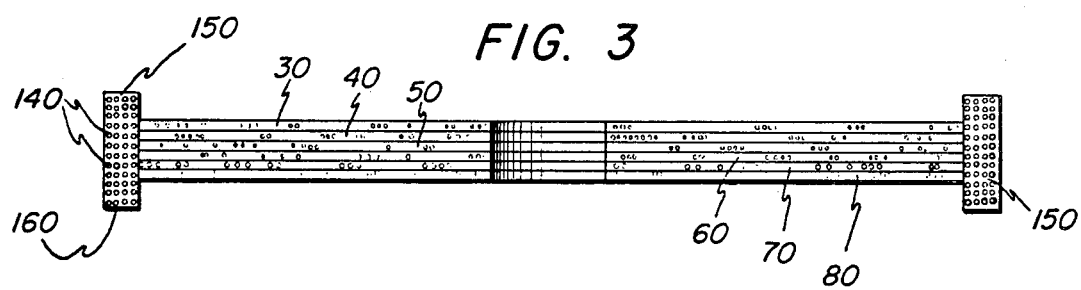
FIG. 3 is a sectional view similar to FIG. 2 showing an alternate embodiment of the reinforced cross-ply composite flywheel of the present invention.

FIG. 3 illustrates a cross-sectional view of a flywheel similar to that shown in FIGS. 1 and 2 but having a rim portion 160 of an axial thickness greater than that of the central portion employed therewith. As seen in FIG. 3, the central portion is uniform in thickness in the direction of the axis of rotation of the flywheel shown therein. Due to the strength of the low density-to-stiffness ratio fibers, the rim portion 160 may be built up as shown in FIG. 3 without a risk of failure from centrifugal loading of the rim portion, thereby providing increased mass and a distribution of that mass which enhances the ability of the flywheel to store energy.

It can be seen then that cross-ply composite flywheels may be reinforced in accordance with the present invention to increase the strength thereof and thus increase the flywheel's capabilities of storing energy. This is accomplished by impregnating with a suitable binder a multiplicity of reinforcement fibers (adjacent fibers being substantially equally spaced) having an appropriate strength and a density-to-stiffness ratio relative to those fibers of the preformed cross-ply central portion as taught herein and wrapping these impregnated fibers around the periphery of the cross-ply central portion of the flywheel while they are maintained under tension. The spacing between fibers 140 may be maintained and the cross-ply portion easily wrapped by employing reinforcing fibers disposed in commercially available tapes preimpregnated with a partially cured binder of epoxy or similar material. By tensioning the rim fibers, while they are being wrapped upon the central portion of the flywheel, the central portion of the flywheel is placed in compression in a radial direction further increasing the ability of the fibers in the central portion to overcome radial displacement due to radially outward centrifugal loading and reducing the risk of the separation of the rim portion from the cross-ply portion. Of course to prevent such separation during operation care should be taken in the curing of the binder in the central and rim portions and in selecting a proper percentage by weight of fiber in the rim and central portions. The binder may then be cured as required while the wrapped rim fibers are maintained in tension.

The resulting flywheel is of a strength, which allows the storing of increased amounts of energy while minimizing the risk of delamination and/or rupture of the radially outer chordal fibers. Because of relatively high-strength and low density-to-stiffness ratio of the fibers employed in the rim portion, these fibers are capable of accommodating some additional centrifugal loading from the cross-ply central portion of the flywheel disk (i.e. the part inside the rim) as well as the centrifugal stress owing to their own weight. The cost of the flywheel constructed in accordance with the present invention is minimized due to the utilization of the relatively costly fibers only at the rim portion of the flywheel where they are most necessitated.

While there have been shown two embodiments of the reinforced cross-ply composite flywheel of the present invention and a method for reinforcing such a flywheel, it will be apparent to those skilled in the art that modifications may be made without departing from the substance of this invention and it is intended by the appended claims to cover such modifications as come within the spirit and scope of this invention.

BEST MODE

The best mode contemplated for carrying out the present invention at the time of executing this application has been set forth in the foregoing description (and illustrated in the accompanying drawing), by way of, for example, setting forth preferred materials and values of variables such as the angular offset, etc.

What is claimed is:

1. A circumferentially reinforced cross-ply composite flywheel comprising:
   (A) a cross-ply composite central portion comprising a plurality of fiber-containing layers, the fibers of each layer being parallel to each other and extending in radial and chordal directions and being disposed in a matrix of binder material, the fibers of each successive layer being oriented at a single predetermined angle of between approximately 70° and approximately 110° to the fibers of the preceding adjacent layer such that at least four of the fibercontaining layers are disposed between any two layers in which the fibers of both such layers extend substantially parallel to each other, and
   (B) load transfer means for radially outward transfer of centrifugal loading from the radially outermost chordal fibers of each layer of said central cross-ply composite portion, said load-transfer means being an outer rim portion contiguous with said cross-ply composite central portion and of an axial thickness at least as great as that of said central portion, said outer rim portion comprising a multiplicity of circumferentially extending fibers disposed in a matrix of binder material, the density-to-stiffness ratio of said rim portion being substantially less in value than the density-to-stiffness ratio of said cross-ply composite central portion.

2. The circumferentially reinforced cross-ply flywheel of claim 1 wherein said cross-ply central-portion is uniform in thickness in the direction of the axis of rotation of said flywheel and the thickness of said rim portion in said direction is greater than the thickness of said cross-ply central portion.

3. The circumferentially reinforced cross-ply composite flywheel of claim 1 wherein the density-to-stiffness ratio of said composite rim portion is 30 to 60% lower than the density-to-stiffness ratio of said cross-ply composite central portion.

4. The circumferentially reinforced cross-ply composite flywheel of claim 2 wherein the density-to-stiffness ratio of said rim-portion fibers is 30 to 60% lower than the density-to-stiffness ratio of said cross-ply central-portion fibers.

5. The circumferentially reinforced cross-ply composite flywheel of claim 4 wherein the density-to-stiffness ratio of said rim-portion fibers is approximately 40% lower than the density-to-stiffness ratio of said cross-ply central-portion fibers.

6. The circumferentially reinforced cross-ply composite flywheel of claim 5 wherein said outer rim-portion fibers are of a polymeric material.

7. The circumferentially reinforced cross-ply composite flywheel of claim 6 wherein the density-to-stiffness ratio of said cross-ply central-portion fibers is approximately $5 \times 10^{-9}$/in. and the density-to-stiffness ratio of said rim-portion fibers is approximately $3 \times 10^{-9}$/in.

8. The circumferentially reinforced cross-ply composite flywheel of claim 1 wherein said single predetermined angle is approximately 80°.

9. The circumferentially reinforced flywheel of claim 1 wherein said cross-ply composite central portion is in compression in a radial direction and said rim-portion fibers are in tension.

10. The circumferentially reinforced cross-ply flywheel of claim 1 wherein said cross-ply central-portion is uniform in thickness in the direction of the axis of rotation of said flywheel and the thickness in the direction of the axis of rotation of said flywheel and the thickness of said rim portion in said direction is equal to the thickness of said cross-ply central portion.

11. The circumferentially reinforced cross-ply flywheel of claim 1 wherein each of said layers is approximately 0.010 inch in thickness.

12. The flywheel of claim 1 of generally solid cylindrical and shape and having a mounting hole extending axially through the center of the plurality of layers for mounting the flywheel on a shaft.

13. A cross-ply composite flywheel comprising a plurality of fiber-containing layers, the fibers of each layer being parallel to each other and extending in radial and chordal directions and being disposed in a matrix of binder material, the fibers of each successive layer being oriented at a single predetermined angle of between approximately 70° and approximately 110° to the fibers of the preceding adjacent layer such that at least four of the fiber-containing layers are disposed between any two layers in which the fibers of both such layers extend substantially parallel to each other, said flywheel having in combination therewith means for radially outward transfer of centrifugal loading from the radially outermost chordal fibers of each layer of said cross-ply composite flywheel, said load-transfer means being an outer rim contiguous with said cross-ply composite flywheel and of an axial thickness at least as great as that of said flywheel, said outer rim comprising a multiplicity of circumferentially extending fibers disposed in a matrix of binder material, the density-to-stiffness ratio of said rim being substantially less in value than the density-to-stiffness ratio of said cross-ply composite flywheel.

14. A flywheel comprising a plurality of fiber layers, the fibers of each layer being parallel to each other an extending in radial and chordal directions, said layers being embedded in a monolithic matrix of binder material, the fibers of each successive layer being oriented at a single predetermined angle to those of the preceding adjacent layer such that at least four layers of fibers are disposed between any two layers in which the fibers of said two layers extend substantially parallel to each other, said predetermined angle having a value between approximately 70° and approximately 110°, said flywheel having in combination therewith means for radially outward transfer of centrifugal loading from the radially outermost chordal fibers of each layer of said flywheel, said load-transfer means being an outer rim contiguous with said flywheel and of an axial thickness at least as great as that of said flywheel, said outer rim comprising a multiplicity of circumferentially extending fibers disposed in a matrix of binder material, the density-to-stiffness ratio of said rim being substantially less in value than the density-to-stiffness ratio of said flywheel.

* * * * *